US008656349B2

(12) United States Patent
Lochmann

(10) Patent No.: US 8,656,349 B2
(45) Date of Patent: Feb. 18, 2014

(54) SYSTEMS AND METHODS FOR TEMPLATE REVERSE ENGINEERING

(75) Inventor: Henrik Lochmann, Dresden (DE)

(73) Assignee: SAP AG, Walldorf (DE)

( * ) Notice: Subject to any disclaimer, the term of this patent is extended or adjusted under 35 U.S.C. 154(b) by 1329 days.

(21) Appl. No.: 12/044,787

(22) Filed: Mar. 7, 2008

(65) Prior Publication Data

US 2009/0228866 A1 Sep. 10, 2009

(51) Int. Cl.
 *G06F 9/44* (2006.01)
(52) U.S. Cl.
 USPC .......................................... 717/107; 104/106
(58) Field of Classification Search
 USPC ................. 717/101–178; 705/1.1; 709/203; 706/48; 713/189, 193; 726/5
 See application file for complete search history.

(56) References Cited

U.S. PATENT DOCUMENTS

| | | | |
|---|---|---|---|
| 6,199,195 B1 * | 3/2001 | Goodwin et al. | 717/104 |
| 6,226,792 B1 * | 5/2001 | Goiffon et al. | 717/120 |
| 6,230,160 B1 * | 5/2001 | Chan et al. | 1/1 |
| 6,360,227 B1 | 3/2002 | Aggarwal et al. | |
| 6,684,388 B1 * | 1/2004 | Gupta et al. | 717/136 |
| 6,742,175 B1 * | 5/2004 | Brassard | 717/107 |
| 6,876,314 B1 * | 4/2005 | Lin | 341/50 |
| 6,877,155 B1 * | 4/2005 | Lindsey | 717/108 |
| 7,047,518 B2 * | 5/2006 | Little et al. | 717/108 |
| 7,110,936 B2 * | 9/2006 | Hiew et al. | 703/22 |
| 7,152,228 B2 * | 12/2006 | Goodwin et al. | 717/146 |
| 7,237,225 B2 * | 6/2007 | Kompalli et al. | 717/108 |
| 7,533,365 B1 * | 5/2009 | Hogstrom et al. | 717/105 |
| 7,546,602 B2 | 6/2009 | Hejlsberg et al. | |
| 7,676,786 B2 * | 3/2010 | Shenfield et al. | 717/104 |
| 7,689,969 B1 * | 3/2010 | Wendling | 717/105 |
| 7,703,073 B2 | 4/2010 | Illowsky et al. | |
| 7,761,848 B1 * | 7/2010 | Chaffin | 717/116 |
| 7,890,928 B2 | 2/2011 | Patrudu | |
| 7,941,438 B2 * | 5/2011 | Molina-Moreno et al. | 707/756 |
| 8,001,519 B2 * | 8/2011 | Conallen et al. | 717/105 |
| 8,015,546 B2 * | 9/2011 | Jones et al. | 717/109 |
| 8,104,017 B2 * | 1/2012 | Lin et al. | 717/107 |

(Continued)

FOREIGN PATENT DOCUMENTS

| | | |
|---|---|---|
| EP | 2098954 A1 | 9/2009 |
| WO | 2008027590 A1 | 3/2008 |

OTHER PUBLICATIONS

Generating Code from UML with Velocity Templates—Thorsten Sturm, Jesco von Voss, and Marko Boger—Gentleware AG, Vogt-Kölln-Str. 30, 22527 Hamburg—UML 2002.*

(Continued)

*Primary Examiner* — Lewis A Bullock, Jr.
*Assistant Examiner* — Francisco Aponte
(74) *Attorney, Agent, or Firm* — Fountainhead Law Group PC

(57) ABSTRACT

Embodiments of the present invention include systems and methods for template reverse engineering. In one embodiment, the present invention includes a computer-implemented method modifying templates in a code generation process comprising receiving a template for generating code, receiving a model for generating code, processing the template and the model in a code generator, and in accordance therewith, generating code based on the model and the template, receiving a modification to the generated code, and in accordance therewith, producing modified code, and automatically changing the template based on the modified code to produce a modified template, wherein processing the modified template and the model in the code generator automatically generates said modified code.

20 Claims, 13 Drawing Sheets

(56) References Cited

U.S. PATENT DOCUMENTS

| | | | |
|---|---|---|---|
| 2002/0178434 A1* | 11/2002 | Fox et al. | 717/106 |
| 2003/0083900 A1* | 5/2003 | Khriss et al. | 705/1 |
| 2003/0163603 A1* | 8/2003 | Fry et al. | 709/328 |
| 2004/0111702 A1* | 6/2004 | Chan | 717/113 |
| 2004/0216087 A1* | 10/2004 | Wilson et al. | 717/116 |
| 2005/0132326 A1* | 6/2005 | Chischportich et al. | 717/106 |
| 2005/0144226 A1* | 6/2005 | Purewal | 709/203 |
| 2005/0204334 A1* | 9/2005 | Parthasarathy et al. | 717/107 |
| 2005/0229154 A1* | 10/2005 | Hiew et al. | 717/110 |
| 2006/0015856 A1* | 1/2006 | Lotter | 717/136 |
| 2006/0111888 A1* | 5/2006 | Hiew et al. | 703/22 |
| 2006/0200799 A1* | 9/2006 | Wills et al. | 717/109 |
| 2007/0086621 A1 | 4/2007 | Aggarwal et al. | |
| 2007/0226244 A1* | 9/2007 | Chandrasekharan et al. | 707/102 |
| 2007/0260571 A1* | 11/2007 | Mansfield et al. | 706/48 |
| 2008/0046868 A1* | 2/2008 | Tsantilis | 717/136 |
| 2008/0082959 A1* | 4/2008 | Fowler | 717/104 |
| 2008/0127057 A1* | 5/2008 | Costa et al. | 717/106 |
| 2008/0127061 A1* | 5/2008 | Kasman et al. | 717/106 |
| 2008/0208855 A1 | 8/2008 | Lingenfelder et al. | |
| 2009/0064096 A1* | 3/2009 | Goebel | 717/106 |

OTHER PUBLICATIONS

Towards Roundtrip Engineering—A Template-Based Reverse Engineering Approach—Manuel Bork, Leif Geiger, Christian Schneider, and Albert Zündorf—Kassel University, Software Engineering Research Group, Wilhelmshöher Allee 73, D-34121 Kassel, Germany—Springer-Verlag Berlin Heidelberg 2008.*

MODA-TEL (Deliverable 3.5), MODA-TEL Methodology and Guidelines (Editor: Mariano Balaunde, France Telecom R&D), Aug. 2004.

Sintef, ECMDA Traceability Workshop (ECMDA-TW), 2005 Proceedings (Nov. 8, 2005).

Ghica Van Emde Boas, "Template Programming for Model-Driven Code Generation,", Oct. 7, 2004.

MOFScript—Project plan for a Eclipse GMT subproject, Dec. 21, 2005.

Jon Oldevik, MOFScript User Guide (Ver. 0.6), Nov. 2, 2006.

Object Management Group, Meta Object Facility (MOF) Core Specification, Ver. 2.0, Jan. 2006.

Meta Object Facility (MOF) 2.0 Query/View/Transformation Specification, Jul. 7, 2007.

Sven Efftinge, Peter Friese, Arno Haase, Clemens Kadura, Bernd Kolb, Dieter Moroff, Karsten Thoms, Markus Voelter, openArchitectureWare User Guide, Ver. 4.2, Sep. 15, 2007.

Sintef, MOF Model to Text Transformation—MOFScript, Jun. 2006.

OMG's MetaObject Facility, Jan. 2008.

IBM, Model with the Eclipse Modeling Framework, Part 1: Create UML models and generate code., Apr. 15, 2004.

Efftinge S. et al., "openArchitectureWare User Guide," Ver. 4.2, Sep. 15, 2007.

European Search Report (from a corresponding foreign application), EP09003299, mailed Jun. 25, 2009.

Hugo Troche, "Refacctoring with Eclipse. Eclipse provides a collection of refactoring features," Internet citation, Oct. 1, 2004.

Holger Krahn and Bernhard Rumpe, "Techniques for Lightweight Generator Refactoring," Generative and Transformational Techniques in Software Engineering Lecture Notes in Computer Science; LNCS, Springer, Berlin, DE, vol. 4143, Jan. 1, 2006.

Martin Fowler; Kent Beck; John Brant; William Opdyke; Don Roberts, "Chapter 11: Dealing with Generalization," Feb. 1, 2001; Refactoring: Improving the Design of Existing code, Addison-Wesley Professional, US pp. 202-208.

Extended European Search Report (from a corresponding foreign application) EP 10004455.1, mailed Jul. 10, 2010.

Jon Oldevik, Tor Neple "Traceability in Model to Text Transformations," SINTEF Information and Communication Technology, Sintef ICT, pp. 31-40, Transformation 2006.

CAFE Methods, Catalogue of Methods and Processes for Product Family Engineering from the CAFE Project, Detailed Descriptions. ITEA Project 2009.

Sven Efftinge, Clemens Kadura, openArchitectureWare 4.1 Xpand Language Reference. Aug. 14, 2006.

EMF, Eclipse Modeling Framework Project (EMF), printed Mar. 4, 2008.

* cited by examiner

SYSTEMS AND METHODS FOR TEMPLATE REVERSE ENGINEERING

BACKGROUND

The present invention relates to code generation, and in particular, systems and methods for template reverse engineering in a code generation software system.

Historically, computer software programs for controlling the operation of computers was created and developed by computer programmers writing the code that defined the operations to be performed. For example, in the early days, computer programmers would write code in such languages as FORTRAN, PASCAL, C, C++, Java, and many other languages. The code would then be compiled to generate machine language instructions (i.e., zeros and ones) for execution on the computer system's hardware. However, developing code by hand is a very time consuming labor intensive process, in some cases requiring hundreds or even thousands of programmer hours to implement a complex software system.

Recently, the concept of code generation has attracted increasing attention. For example, rather than writing computer programming code line by line, code generation paradigms posit that a software developer specify the desired operational behavior of the software and the functional specification may be used to automatically generate code in any desired language or for any desired platform. However, the promise of automatic code generation has not gone completely fulfilled because of inherent difficulties in implementing such systems.

The paradigm of Model-Driven Software Development motivates the lifting of fine-grained code structures and development to coarser-grained models and higher levels of designing. This abstraction process shall approximate the developer's mental model of the underlying implementation and, hence, reduce the necessary effort in production of such. Based on readily developed system architecture models, appropriate code generators produce later on executable runtime code.

For example, one approach to automatic code generation is referred to as Model-Driven Software Development ("MDSD" or "MMD"). FIG. 1 illustrates a typical MDSD architecture. The example MDSD software includes a model 101, template 102, code generator 103 that generates code 104. A model 101 describes the structure and behavior of a software system. This description may be a high level description of states, entities, transitions, and a variety of other factors for describing the software, The model may be an instance of a meta model for describing a system at a higher level of abstraction (i.e., more generally). The model may be specified using a modeling language, for example. A modeling language is any artificial language that can be used to express information or knowledge or systems in a structure that is defined by a consistent set of rules. The rules are used for interpretation of the meaning of elements in the structure. Modeling languages can be used to specify system requirements, structures, and behaviors. Modeling languages are intended to be used to precisely specify systems so that stakeholders (e.g., customers, operators, analysts, designers) can better understand the system being modeled. Example modelling technologies are Eclipse Modeling Framework ("EMF"), whose language to create metamodels is called "ECore" (the metametamodel), and the MetaObject Facility ("MOF") from the Object Management Group with the metametamodel also called "MOF" or a smaller version "EMOF" (essential MOF).

Templates 102 are used to generate code based on a model in the context of a meta-model. Templates control output code generation. For example, a template may be used to access the model, execute logic, and perform various other tasks. The template may be a text file that is interpreted by the code generator 103 at runtime to generate code 104. Templates may include one or more import statements, one or more extension statements, and one or more define blocks (i.e., definitions) and may be written in template languages such as XPAND and MOFScript, for example.

However, developing templates for the above mentioned code generators is a time-consuming and error-prone process. Current MDSD tools commonly provide editors for template languages, used by generator engines. Unfortunately, the useful features of such editors, like e.g., syntax highlighting, code completion or even full compilation, support only corresponding template languages and not the language the generated code adheres to. This very often results in templates that are themselves valid but produce erroneous or insufficient code. Hence, each time a generator template is changed, the developer has to re-execute the generator to afterwards check the generated code for errors or insufficiencies.

FIG. 2 illustrates the time consuming process of debugging templates. One or more models 201 and a template 202 may be provided to a code generator 203. The code generator 203 may generate one or more code artifacts 204 (e.g., methods, procedures, or classes in one or more files, etc. . . . ). A developer may review the generated code and determine that some code is valid at 205, but that other generated code is erroneous or does not satisfy desired system requirements at 206. Accordingly, a user must manually revise the template to implement the desired change to the generated code.

Revising templates from erroneous code can be a time consuming process that undermines the promise of model driven development. Thus, there is a need for the improved systems and methods for template engineering. The present invention solves these and other problems by providing systems and methods for template reverse engineering in a code generation software system.

SUMMARY

Embodiments of the present invention include systems and methods for template reverse engineering. In one embodiment, the present invention includes a computer-implemented method modifying templates in a code generation process comprising receiving a template for generating code, receiving a model for generating code, processing the template and the model in a code generator, and in accordance therewith, generating code based on the model and the template, receiving a modification to the generated code, and in accordance therewith, producing modified code, and automatically changing the template based on the modified code to produce a modified template, wherein processing the modified template and the model in the code generator automatically generates said modified code.

The following detailed description and accompanying drawings provide a better understanding of the nature and advantages of the present invention.

DETAILED DESCRIPTION

Described herein are techniques for information extraction. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

To alleviate the problem described above, a mechanism is needed, which enables the developer to directly reflect the modifications he/she made to the generated code back into the templates automatically. This way, the developer is not forced to switch between generated code artifacts and generator templates, but rather, is provided with a mechanism to edit both interchangeably. This results in a much more efficient generator template development process.

Figure 1:
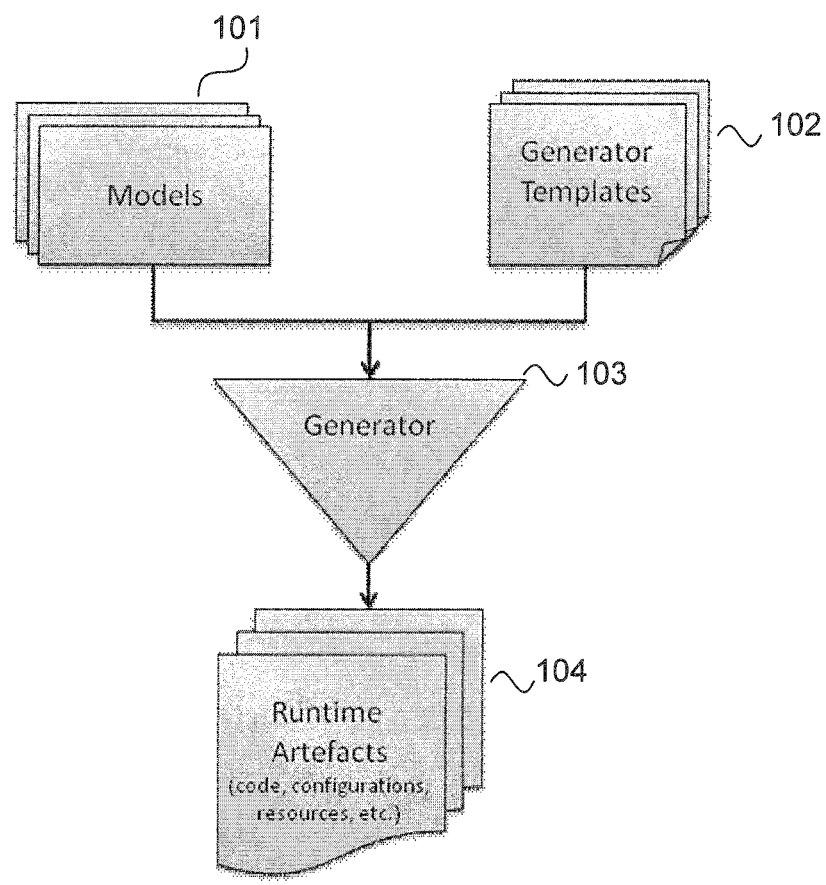
FIG. 1 illustrates a typical model driven software development architecture.
Figure 2:
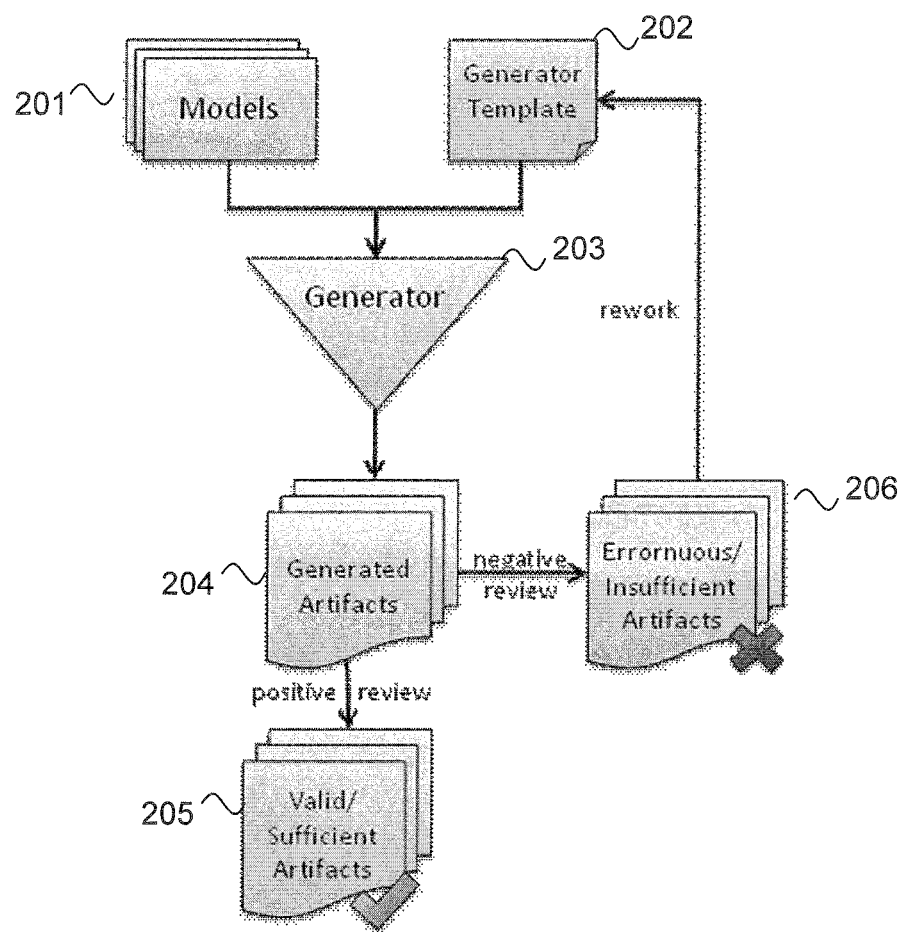
FIG. 2 illustrates the process of debugging templates.
Figure 3:
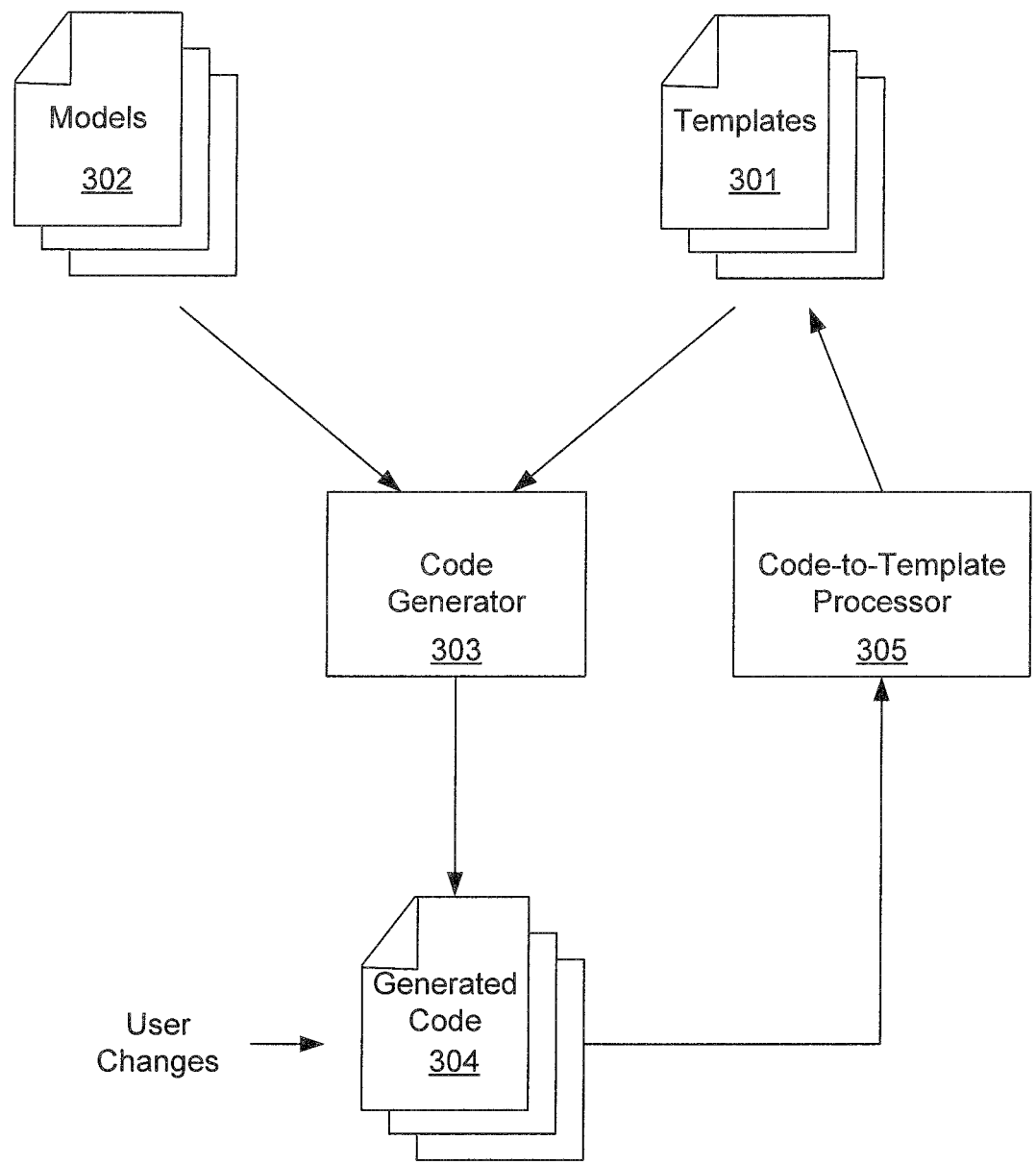
FIG. 3 is an example of template reverse engineering according to one embodiment of the present invention.

FIG. 3 is an example of template reverse engineering according to one embodiment of the present invention. The present example is described in the context of Model-Driven Software Development ("MDSD" or "MDD"), but other embodiments of the present invention may be used in other template based code generation technologies. FIG. 3 illustrates model driven architecture where one or more templates 301 and one or more models 302 are used to generate code. As mentioned above, model 302 describes the structure and behavior of a software system and may include model elements that describe states, entities, transitions, for example, of the desired software for which code is to be generated. The model may be an instance of a meta model for describing a system at a higher level of abstraction (i.e., more generally) and may be specified using a modeling language EMF or MOF.

Templates 301 are used to generate code based on a model in the context of a meta-model. Templates control output code generation and, as mentioned above, may be used to access the model, execute logic, and perform various other tasks. The templates may be text files that are interpreted by the code generator 303 at runtime to generate code 304. The code may be generated in a single file or in a plurality of separate files or modules, for example. Embodiments of the present invention allow a user (e.g., a software developer) to make changes to the generated code. For example, the code generated based on the provided templates may include errors or lack certain functionality, and the user may want to modify the code and have the changes reflected back into the template automatically. According to embodiments of the present invention, user changes to the generated source code are automatically propagated back into the templates used to generate the code. Accordingly, a user may modify the source code, and the modified source code is used to modify the templates. Therefore, the next time the templates and models are processed by the code generator, the code generated automatically includes the modifications made by the user. Thus, a user does not need to rewrite the templates in order to make changes directly in the code. As illustrated in FIG. 3, a code-to-template processor 305 receives the modified generated code. Code-to-template processor automatically changes the template(s) used to generate the code on the previous run based on the modified code to produce one or more modified templates. As a result, the code generated subsequently by the code generator based on the model(s) and modified template(s) automatically generates code including the user's modifications (i.e., modified code).

Figure 4:
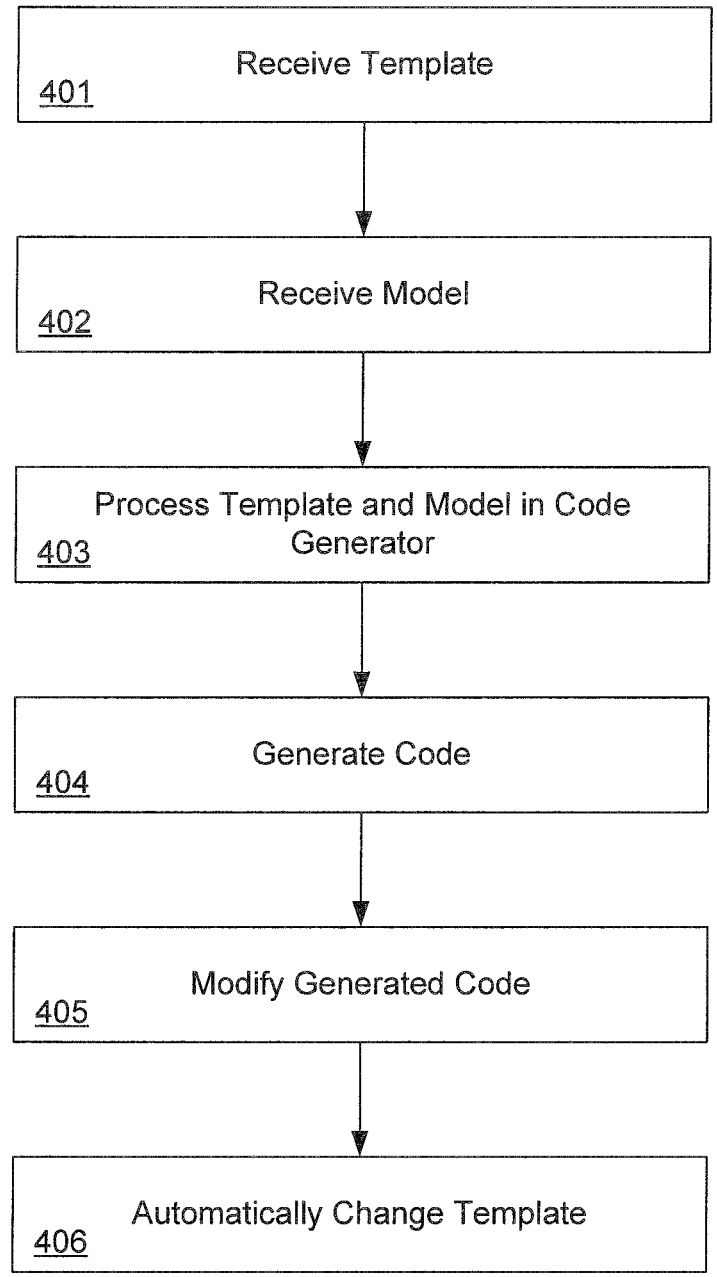
FIG. 4 illustrates a method according to one embodiment of the present invention.

FIG. 4 illustrates a method according to one embodiment of the present invention. At 401, the system receives one or more templates for use in generating code. At 402, the system receives one or more models for use in generating code. At 403, the template(s) and model(s) are processed in a code generator. At 404, source code is generated by the code generator based on the specifications in the model(s) and template(s). At 405, a user may modify the code. The code modifications may be received through a graphical user interface including an editing tool, for example. At 406, the system automatically changes one or more templates based on the modified code to produce modified templates. Therefore, processing the modified templates and the model(s) in the code generator automatically generates modified code previously created by the user.

Figure 5A:
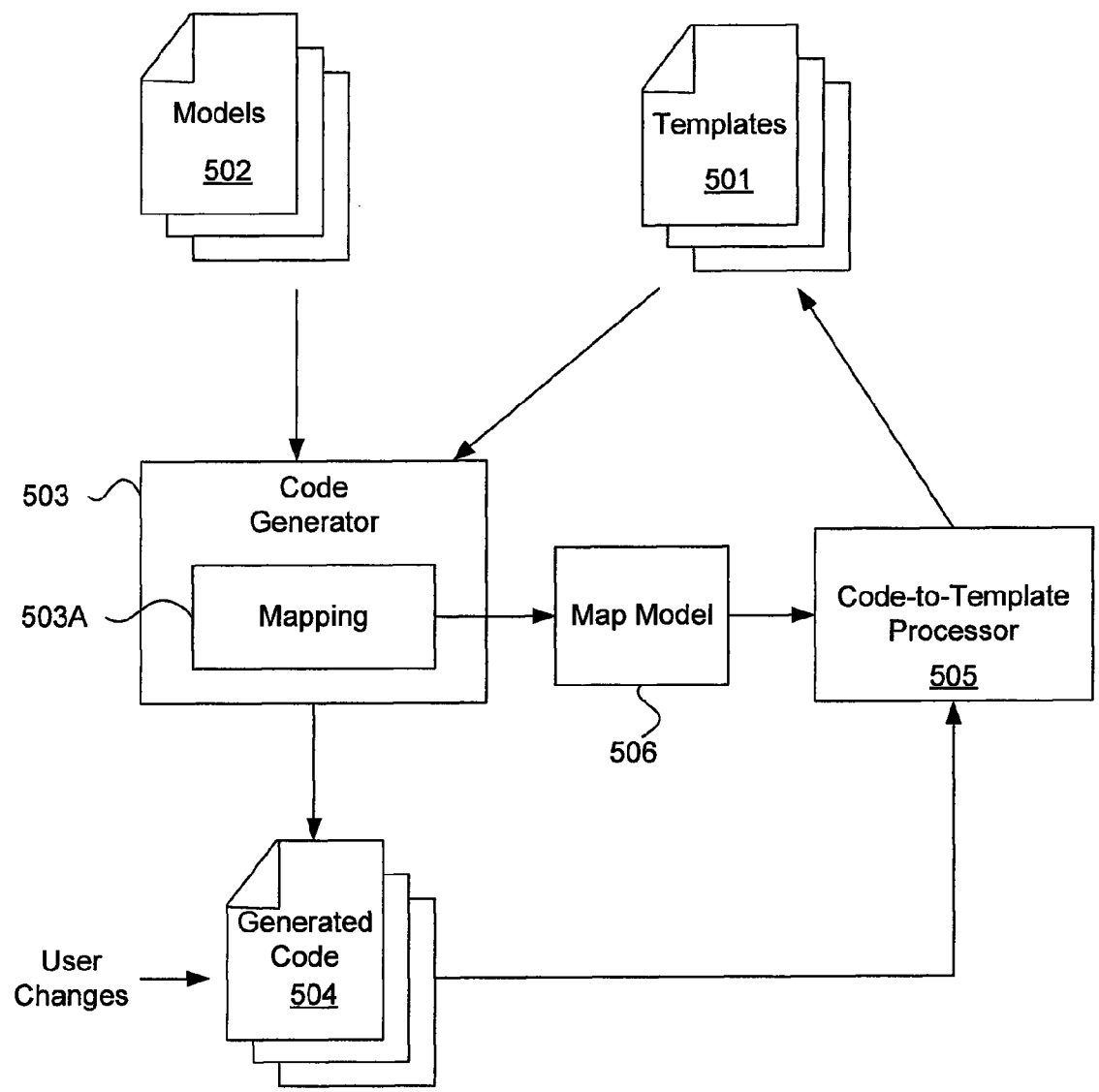
FIG. 5A is an example of a software development architecture according to one embodiment of the present invention.

FIG. 5A is an example of a software development architecture according to one embodiment of the present invention. In this example, templates 501 and models 502 are received by code generator 503. One example implementation of a code generator may include a mapping component 503A. A mapping component 503A may be included as a component of the code generator, or a mapping component may be a separate component from the code generator. Mapping component 503A maps one or more elements in the template(s) to corresponding elements in generated code 504. Accordingly, information is available to determine which portions of a template (or which template) caused particular corresponding portions of code to be generated. As described in more detail below, the mapping component may further include mappings between the code 504 and the model used in generating the code. Mapping component generates mapping information, which may be provided as a mapping model 506, for example. The mapping model includes information for linking elements of the generated code with elements of the template that caused the code to be created. Mapping model 506 may be provided to code-to-template processor component 505. Code-to-template processor 505 may use the mapping information to automatically change elements of a template if corresponding elements of the generated code are modified.

Figure 5B:
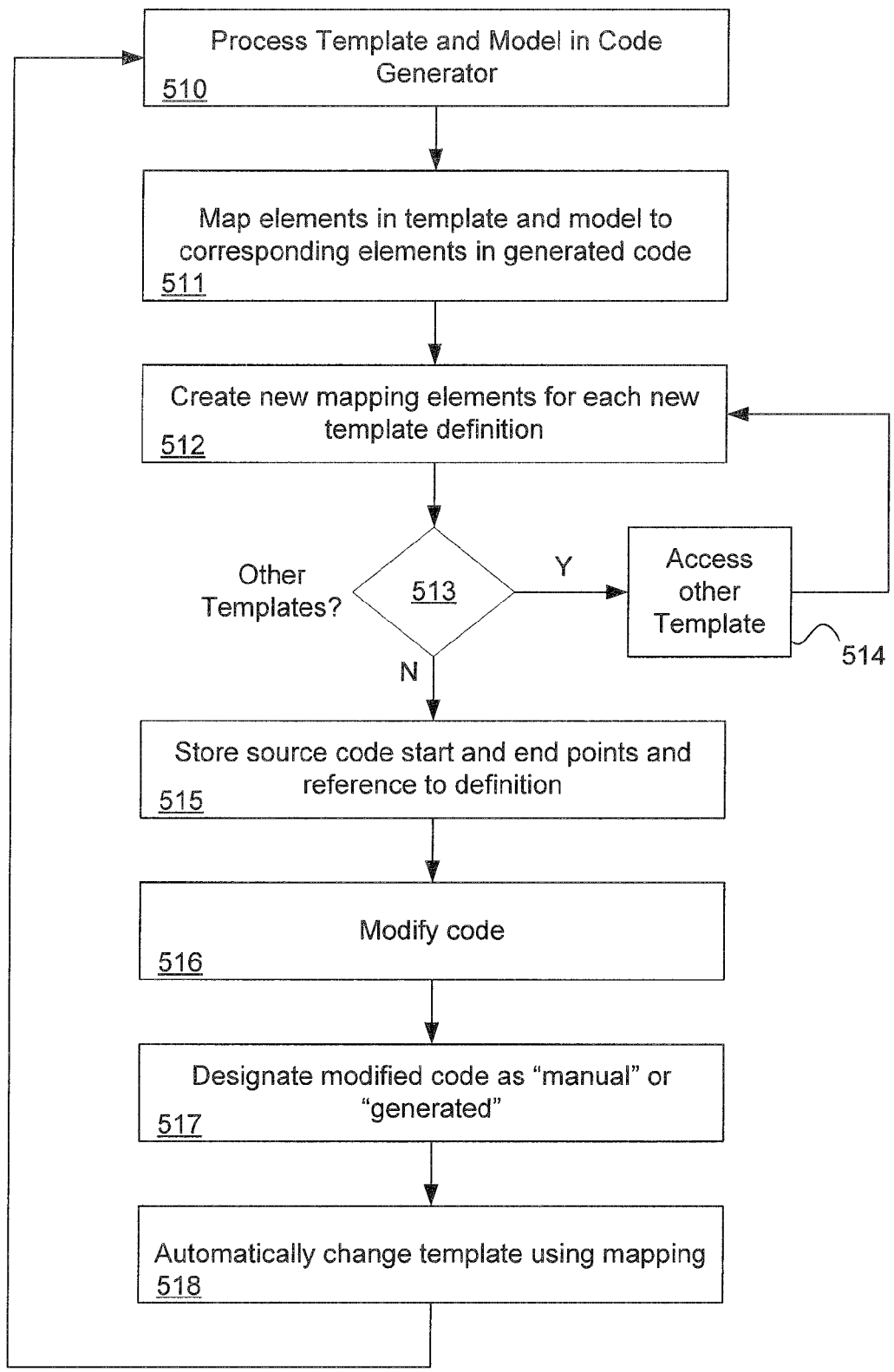
FIG. 5B illustrates a method according to one embodiment of the present invention.

FIG. 5B illustrates a method according to one embodiment of the present invention. At 510, one or more templates and one or more models are received and processed by a code generator. At 511, elements in the templates and elements in the model specified by the templates are mapped to corresponding elements in the generated code. As illustrated in more detail below, templates typically include definitions of source code constructs to be generated based on specified elements of the model (e.g., for model element A generate source code construct B). Definitions may be used to specify one or more source code constructs to generate to implement one or more model elements. At 512, new mapping elements (or blocks) may be created for each definition in a template. Separate mapping elements may provide a clear link between generated code constructs and the template elements (e.g., the definitions) that cause such code to be generated. In some applications, templates may refer to other templates. The developer may desire to specify the code to be generated using multiple templates logically partitioned according to some reasoning (e.g., functionality), for example. Accordingly, the code generator may access one or more templates from another template as part of the code generation process. At 513, a decision step represents the case where more templates may need to be accessed. If additional templates are referenced as part of the code generation process, then the other templates are accessed at 514, and the process creates additional mapping elements for each template definition in the other templates. If no other templates are referenced, then the process proceeds to 515. At 515, source code start and end points may be stored. For example, if an element of code is generated (e.g., a new class or a new method), the start and end points of the generated source code in the output file of the code generator may be stored so that location of the code is known. Additionally, a reference to the definition that caused the code element to be created may also be stored together with the start and end points. This information may be stored in the mapping model described above, for example.

At 516, the generated source code may be modified by a developer. Modifications may be made to fix certain errors the actual template produces, to implement additional parts that are to be generated in the actual template, or to adjust already implemented template parts to better fit the application, for example. However, some user's may desire to directly write new portions of source code into the code files without having the changes reflected back into the templates. However, sometimes when new code is generated, the existing files are typically overwritten, and changes to the code will be lost. Accordingly, it may be desirable in some embodiments to allow a programmer to write code, designate the code as "manual" or "generated", selectively reflect code modifications back into the template based on the designation, and in some cases prevent the system from overwriting the designated code the next time source code is generated. At 517, a user may designate modified code as "manual" or "generated", for example. Code designated as "generated" may be used to automatically change the template, and code designated as "manual" may automatically change the template to designate where in the existing code the manual code resides. Additionally, modified code designated as "generated" may be overwritten during subsequent code generation, and modified code designated as "manual" may not be overwritten during subsequent code generation, for example. At 518, the templates are automatically changed using the mapping information and the process may be repeated.

Figure 5C:
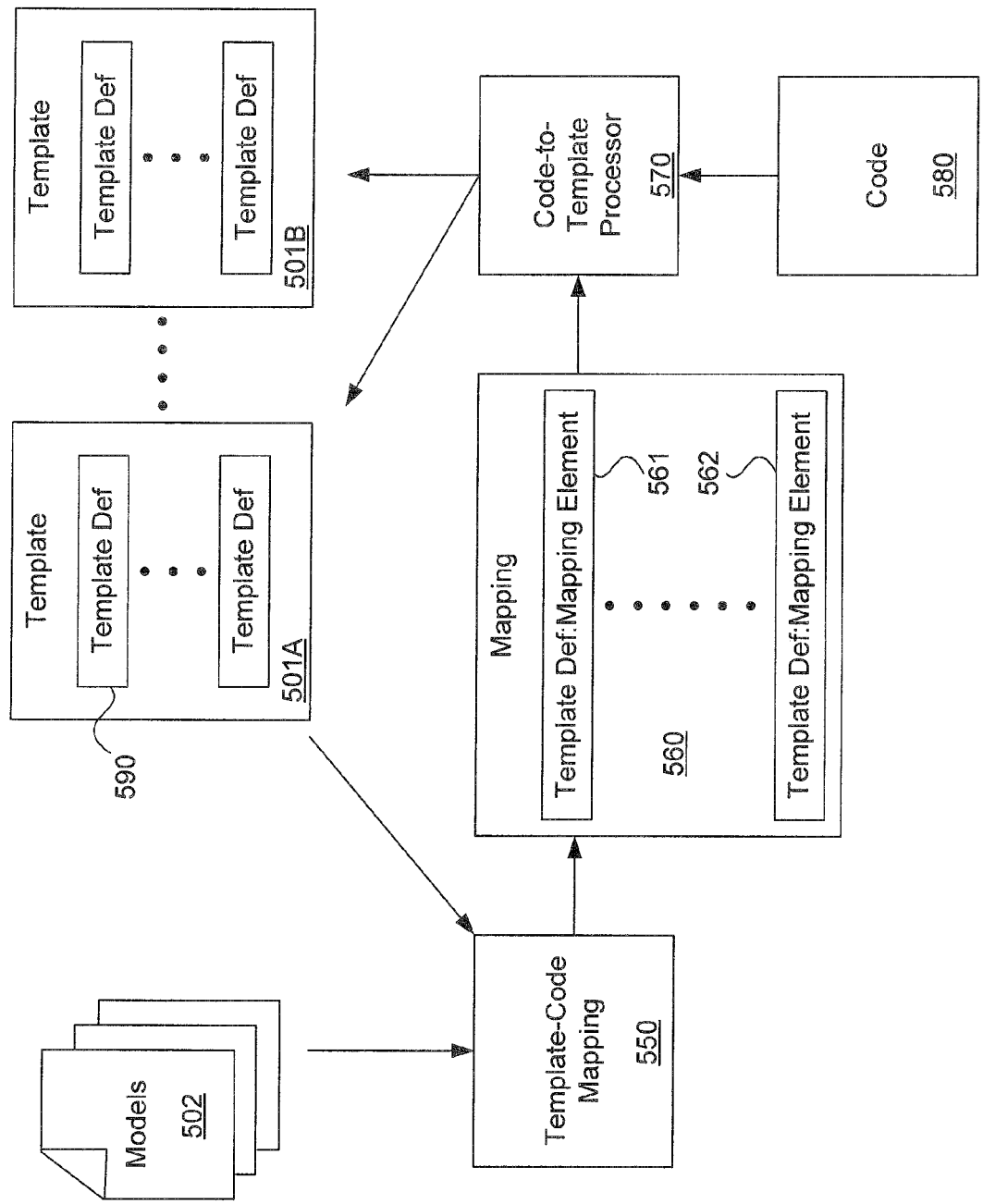
FIG. 5C is an example of mapping according to one embodiment of the present invention.

FIG. 5C is an example of mapping according to one embodiment of the present invention. In this example, a plurality of templates 501A-B each include multiple template definitions 590 for specifying source code constructs to be generated based on specified elements of the model. Templates 501A-B and models 502 are processed by template-code mapping component 550, which maps one or more elements in the templates to corresponding elements in generated code where the element in a template caused the corresponding element in the generated code to be generated. Template-code mapping component 550 monitors the processing of the template in the code generator and, in this example, stores a new mapping element (e.g., mapping elements 561 and 562) in a mapping model each time a template definition is processed. Mapping model 560 may also be referred to as a code-to-template reverse traceability model, since it allows tracing of source code elements back into the template elements that caused the code to be created. The different mapping elements 561 and 562 specify a relationship between a definition in the template and a corresponding element in said generated code. Separate mapping elements facilitate the linking between changes in the code and the corresponding template that needs to be changed. In some cases, one or more template definitions may access other templates, and a new mapping element is created each time a new template is accessed. As described in more detail below, one example template language may be XPAND, where the definitions are DEFINE statements and the DEFINE statements include a plurality of EXPAND statements. Accordingly, in this example implementation, a new separate mapping element is created each time a DEFINE statement is expanded by an EXPAND statement. It is to be understood that other template languages and other definition mechanisms may be used. As mentioned above each mapping element may specify the start and end of the code generated by said definition. In one example implementation, each mapping element stores a start line, end line, start column, and end column of the code generated by said definition. Such information may be useful where code is stored in files with each character in the code having a line and column position, for example. Furthermore, each mapping element may store a reference to the definition that caused the generated code to be generated.

Mapping 560 may be received by code-to-template processor 570 for reflecting changes in generated code back into the templates. Code-to-template processor 570 (also referred to as a change processor) may receive code 580 that has been modified by a user. The modifications and mapping information are then used to change templates 501A-B so that the next time the code is generated using the modified templates, the modifications are automatically implemented in the newly generated code.

Example

The following example illustrates features and embodiments of the above invention in more detail Code generation with automatic template reverse engineering may include two stages: a mapping or traceability creation stage and a change evaluation stage. During the mapping/traceability creation stage a mapping of template parts to certain text portions in generated artifacts is created. This mapping is sometimes referred to as a code-to-template reverse traceability model. To understand how the mapping model is created, consider the following code listing, which shows an excerpt of an XPand template. XPand is a template language that facilitates model to text generation within the openArchitecureWare generator framework.

```
«DEFINE javaClass(String bundleId) FOR
businessobjects::BusinessArtefact»
    «FILE getFileForPackage(bundleId, this.name)»
package «bundleId»;
public class «this.name»{
    «EXPAND javaProperty FOREACH this.attributes»
    «EXPAND javaProperty FOREACH this.references»
}
    «ENDFILE»
«ENDDEFINE»
```

As described above, code generator templates act upon models that describe the desired software functionality and operation. Therefore, a generator template is developed by defining textual parts that are to be generated for certain metamodel elements. The models the templates act on are then instances of this metamodel. The above template listing defines the definition of a java class for the element "BusinessArtefact" of the "businessobjects" metamodel. Within this template definition, another template is expanded, namely the template "javaProperty" for the "BusinessArtefact" properties "attributes" and "references", which point themselves to other BusinessArtefacts.

Mapping Creation

The above mentioned mapping model is created through monitoring the output generation process of the code generator engine for complete template files. There are several ways to create mapping or traceability models. For example, in approach may be to access the code running during generation process of the generator engine. For instance, a plug-in for the generator engine may be used that provides information each time the generator "calls"/"executes" an EXPAND block, and thereby provide access to the corresponding EXPAND statement and the resulting lines of generated code. Each time a template definition is expanded, in the listed example indicated by the DEFINE directive, a new mapping element (also referred to as a traceability block) is created in the corresponding mapping model. For example, "template" or "template file" may have several DEFINE blocks. Hence, a template file contains several DEFINEs, and the mapping model will track the code each DEFINE block generates. The mapping model may be created when the generator engine executes the template. In this case, each DEFINE statement is "executed"/"expanded" programmatically using an identifiable portion of code within the code generator engine. At this place in the engine, for example, a corresponding mapping model element is created and the lines of code that were created in which resulting file may be recorded. An EXPAND template may execute a call statement of a DEFINE block, which advises the generator engine to "expand" a template definition. If EXPAND statements are within one DFEINE block, the mapping model records the lines of code created until these EXPAND statements, and may restart recording after execution of the EXPAND statement. Hence, the mapping element block for a DEFINE statement may contain gaps. Thus it contains several trace blocks. Mapping elements may contain information about start line, end line as well as start column and end column of the code in the resulting code file. Additionally, a backward reference to the DEFINE element that the generated code block stems from is stored within a corresponding mapping element. Accordingly, information is captured within the mapping model to reflect changes in the generated code elements back to the template elements that cause the code elements to be generated.

Figure 6:
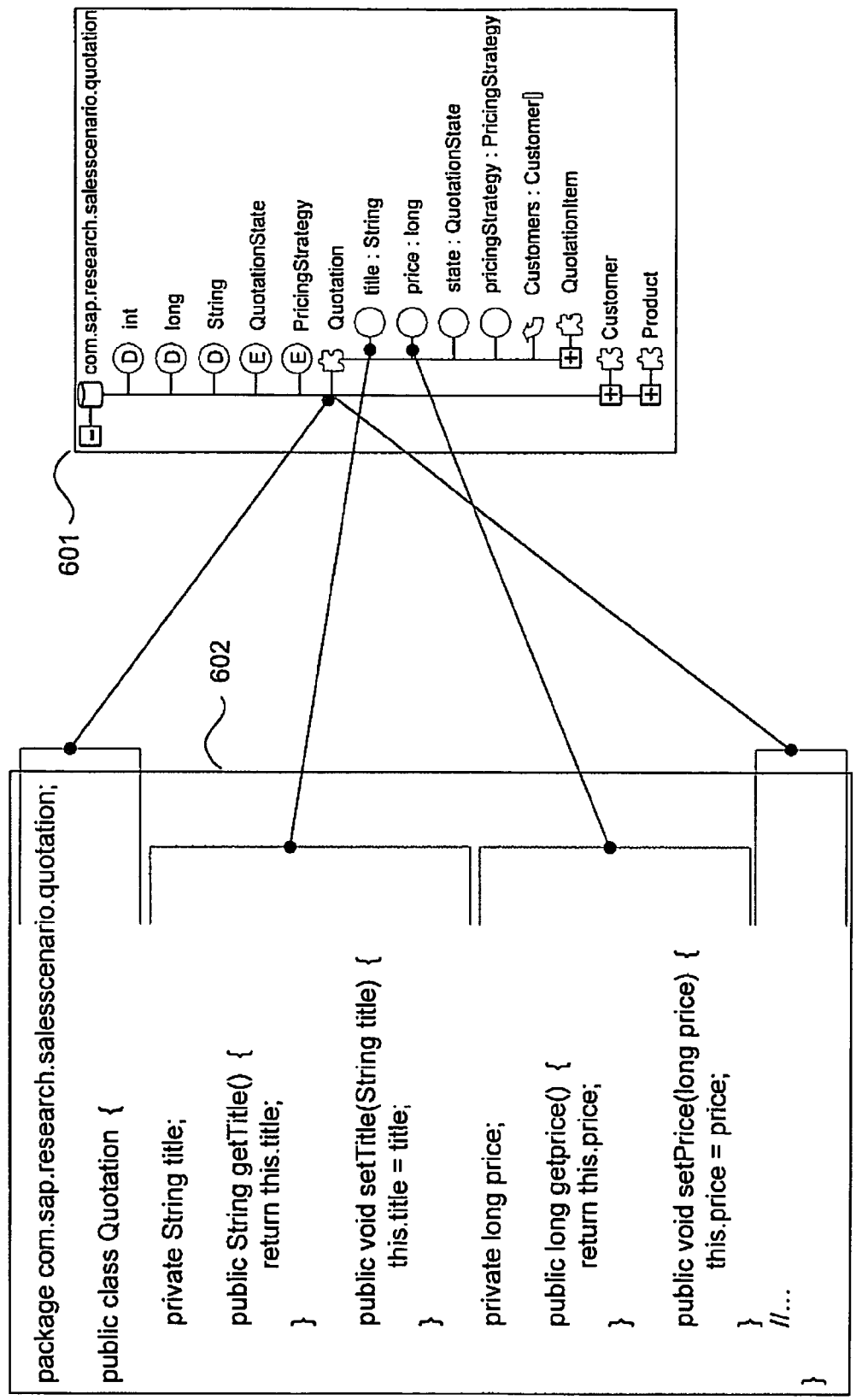
FIG. 6 illustrates a portion of the information stored within a mapping model according to one embodiment of the present invention.

FIG. 6 illustrates a portion of the information stored within the mapping model according to one embodiment of the present invention. On the right hand side, a model 601 instance is depicted. The model 601 specifies the functional/operational aspects of the software for which code is to be generated. To distinguish model 601 from a mapping model, model 601 shall be referred to as a software model. The software model 601 contains among other things, the "Quotation" element. This element represents a class-like structure and contains additional properties such as e.g., the "title" and "price" properties. On the left-hand side, the java source code 602 is illustrated. This is the code generated from the software model 601. As shown, the result is a java class with appropriate attributes and getter/setter methods. The connections between the software model 601 and generated code 602 represent information that may be stored in the mapping/traceability model. Thus, a mapping model contains information which indicates that the model element "Quotation" is represented as class body with corresponding segments in the correspondent java file. In the same way, references between the software model elements title and price and their representations in the resulting source code may be stored.

Figure 7:
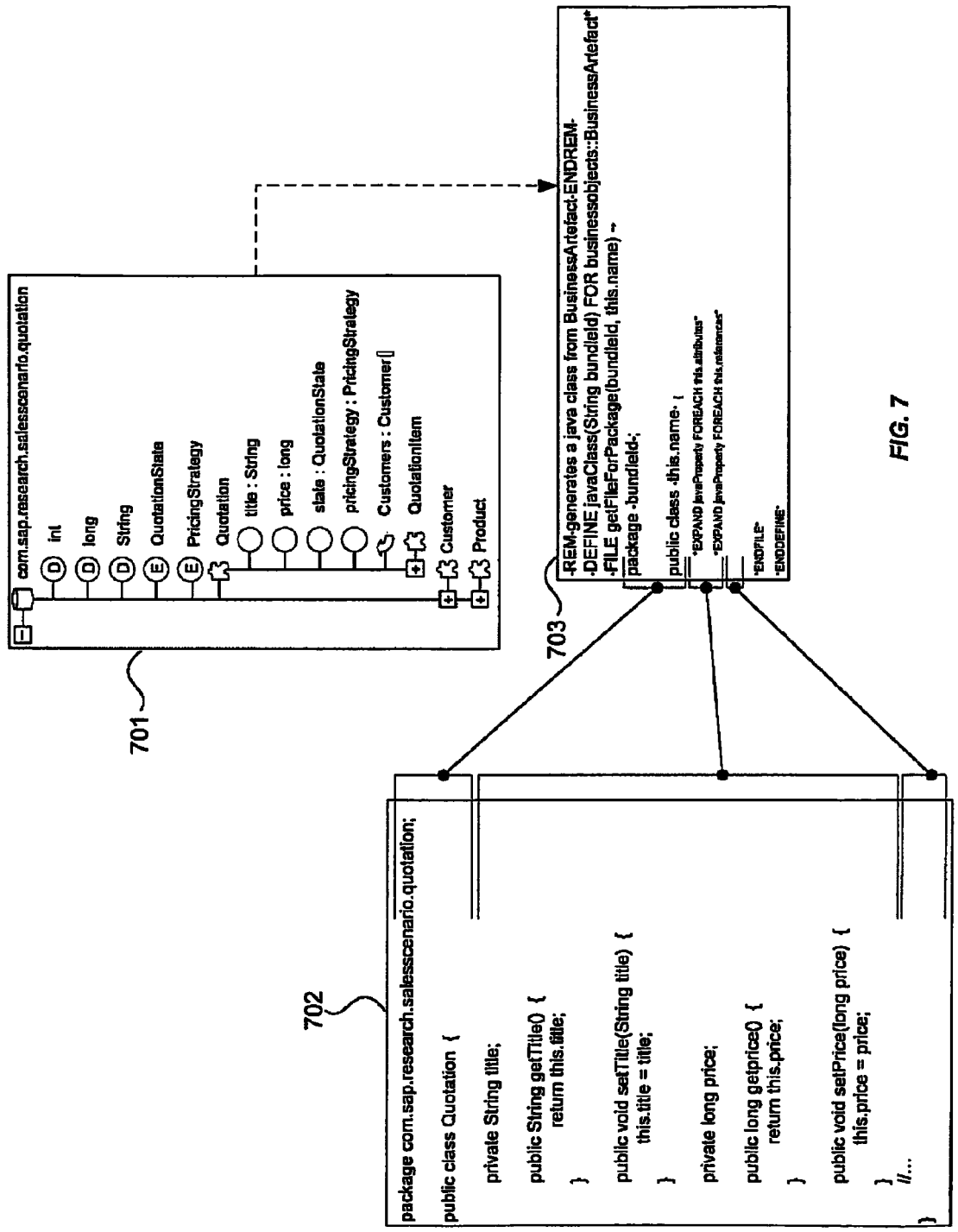
FIG. 7 illustrates a portion of the information stored within a mapping model according to one embodiment of the present invention.

FIG. 7 illustrates a portion of the information stored within a mapping model according to one embodiment of the present invention. To realize the proposed template reverse engineering, information describing which generator template produced the source code should be stored in a mapping model. This information may, optionally, but not necessarily, be stored together with tracing information between the software model elements and source code was well. To capture this information, the mapping model also stores references to the corresponding generator template(s) as illustrated in FIG. 7. FIG. 7 illustrates a software model 701 and resulting code 702. Additionally, the right hand side shows the generator template 703 that produced the code (See Template Listing above). The connections between template segments and source code segments illustrate which template parts are responsible for generation of which source code parts. The dashed arrow between software model 701 and template 703 indicates that the software model was used as an input to the code generator with the template. With the information of the mapping model described above, an example approach is provided to facilitate the navigation from source code artifacts back to the generator templates that created these artifacts.

Code-to-Template Change Processor

Figure 8:
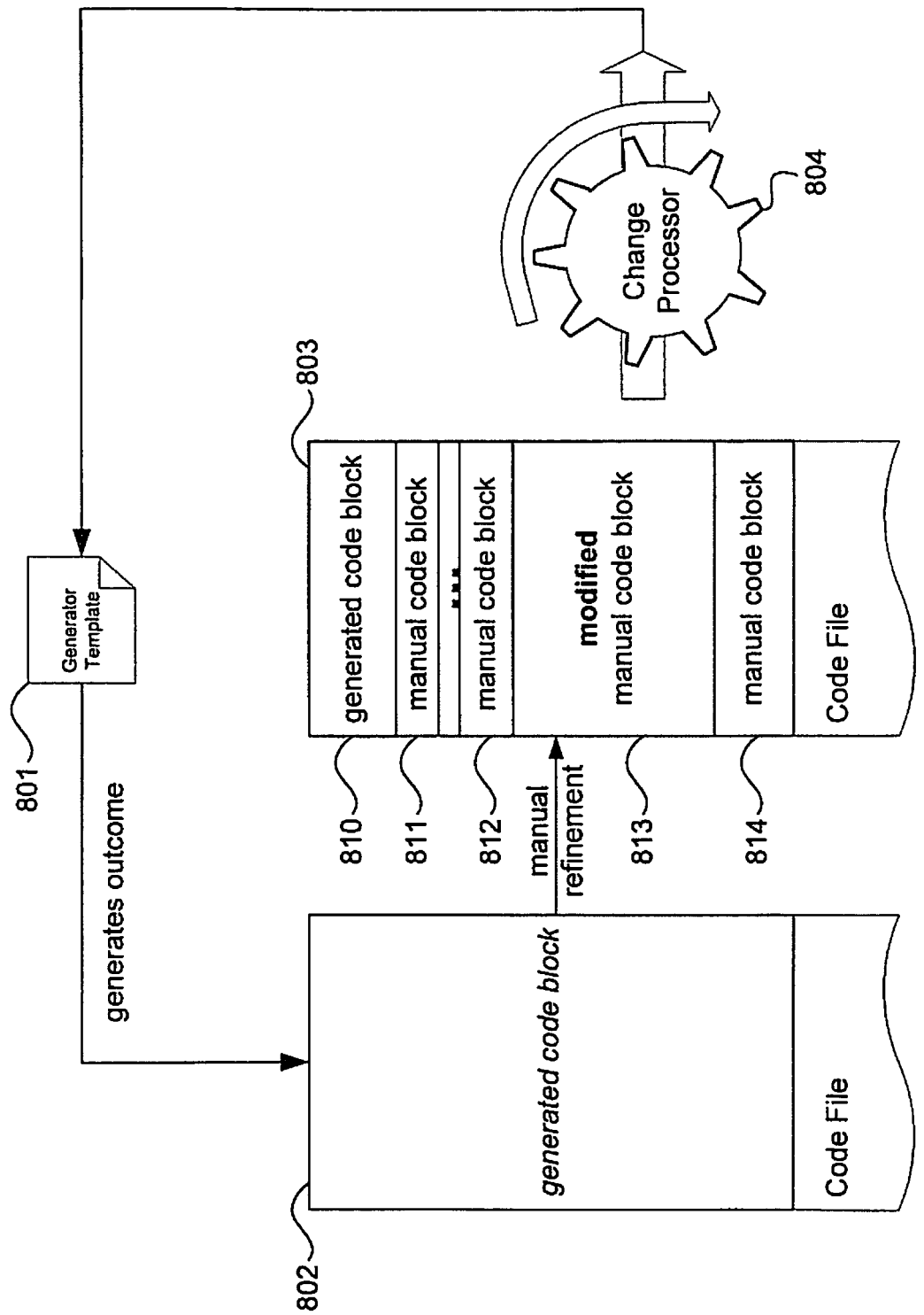
FIG. 8 illustrates designation of modified code according to one embodiment of the present invention.

FIG. 8 illustrates designation of modified code according to one embodiment of the present invention. As mentioned above, some embodiments of the present invention may allow a programmer to modify code and designate that some code is not to be used to modify a template. Accordingly, an appropriate mechanism should be used to distinguish between code portions that are manually added and code portions that belong to the original template. To support the developer in discerning the different parts, such a distinction may be implemented within the available tools on user interface level as described below. As illustrated in FIG. 8, a template 801 is used to generate a code block 802. Generated code 802 may undergo manual refinement by a developer. Some of the modifications may be intended to be reflected back into a modified template so that the changes are implemented automatically the next time the modified template is used to generate code. However, other modifications may be intended not to change the template. Changes that are not intended to change the template may be designated "manual" by the developer. Similarly, changes that do change the template may be designated "generated". Designated modifications to the generated code are illustrated at 803. In this example, modifications at 811, 812, and 814 have been designated "manual". On the other hand, modifications at 813 are designated "generated". There has been no modification to the code at 810, so no designation has been made. Code-to-Template Change Processor 804 receives the modified code and modifies template 801. For example, in one embodiment an in-memory model representing the template file is created by the code generator engine when loading a template. Within this in-memory model, the changes to the template can be performed by the change processor. Afterwards, the in-memory model may be serialized, written to hard disk, or regenerated respectively. The modified code designated as "generated" is used to automatically change the template. However, the modified code designated as manual is not used to automatically change the template. Accordingly, if modified template 801 is processed again by a code generator, the modifications at 813 are automatically part of the generated code. In this example, because the changes at 813 have been designated "manual", modified code designated as "generated" is overwritten during subsequent code generation (e.g., into the same file). However, because the changes at 811, 812, and 814 have been designated "manual", such changes are not part of the newly generated code. Rather, modified code designated as manual is not overwritten during subsequent code generation, so the manual modifications are preserved in the code file. It is to be understood that "protecting" certain portions of the code modifications with overwrite protection is just one example implementation.

Figure 9:
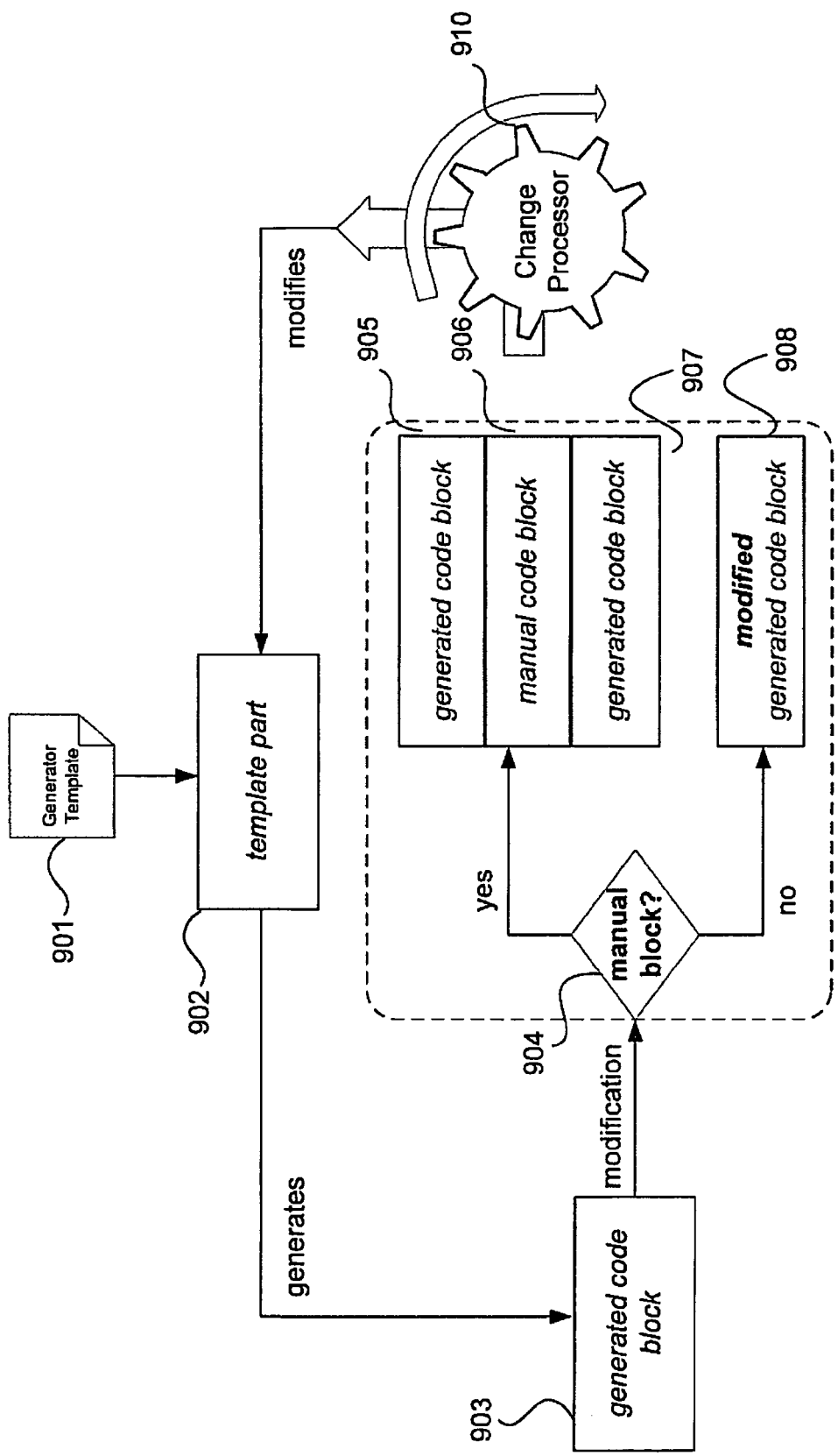
FIG. 9 illustrates template modification and overwrite control based on designation of modified code according to one embodiment of the present invention.

FIG. 9 illustrates template modification and overwrite control based on designation of modified code according to one embodiment of the present invention. The created mapping model described above is the code-to-template change component's processing basis during the change evaluation stage. As illustrated in FIG. 9, generator template 901 may comprise a plurality of template elements 902 (i.e., template parts). The template parts each cause the generation of code elements 903 (i.e., code blocks). Each time a developer modifies the generated code file, the change processor 910 tracks this change and evaluates whether the modification took place within generated or manually added code blocks. Accordingly, the system determines if the user change is a modification to generated code or if the user change is a completely new code block at 904. In this example, code block 908 has a corresponding element in template 902 that was the origin of block 908 before it was modified. However, code block 906 is a newly created code block that was manually entered by a user. The "yes" branch in FIG. 9 shows the insertion of a manual code block. This means, within a completely generated code block (e.g., between blocks 905 and 907), the user inserts new lines of code for block 906. In this case, the beginning and the end of the generated code block remains as is. Only the newly added lines of code for block 906 have to be inserted in the template. Therefore, a protected region may be inserted in the corresponding DEFINE block of the template to indicate where the manual code has been added. Therefore, block 906 has no corresponding elements in template 902 that was the origin of block 906 before it was created by a user. In the case where the modified code block was generated by the code generator on the previous run (e.g., block 908), such a block is not a manually added block (i.e., manual block?=No), and the user modifications to such blocks may be tracked back to the generator template and used to modify the template. In the case where the user adds a new code block that was not previously part of the generated code (e.g., block 906), the system may allow a user to designate such blocks as "manual" or "generated" as described above. To enable the developer to insert manually written code blocks, which may be preserved when regenerating the code, the developer may be asked whether a modification shall be used to modify the template or not.

If the added code block is designated as "manual" code that is to be preserved, a "protected region" may be created in the corresponding template. Protected regions are parts in generated content that are not overridden at regeneration. In some embodiments, protected regions may be inserted in both the generating templates and the generated code. In templates they occur within DEFINE blocks with a proper statement (e.g., "PROTECT CSTART . . . ENDPROTECT"). In the generated code they may occur as comment blocks with a certain ID in each protected region. During the code generation process, the code generator may looks into already generated files and searches for the protected region comments. If an ID is used, the code generator may match the IDs and prevents the regions from being overwriting. Accordingly, in some implementations the template may be changed as well as the code for "manual" designated code changes, but only with a new protected region. The content of the manual added block is not transferred into the template. In case the developer designates the modification as "generated", the modifications are to be reflected in the template, and the change processor may adjust the template accordingly.

Figure 10:
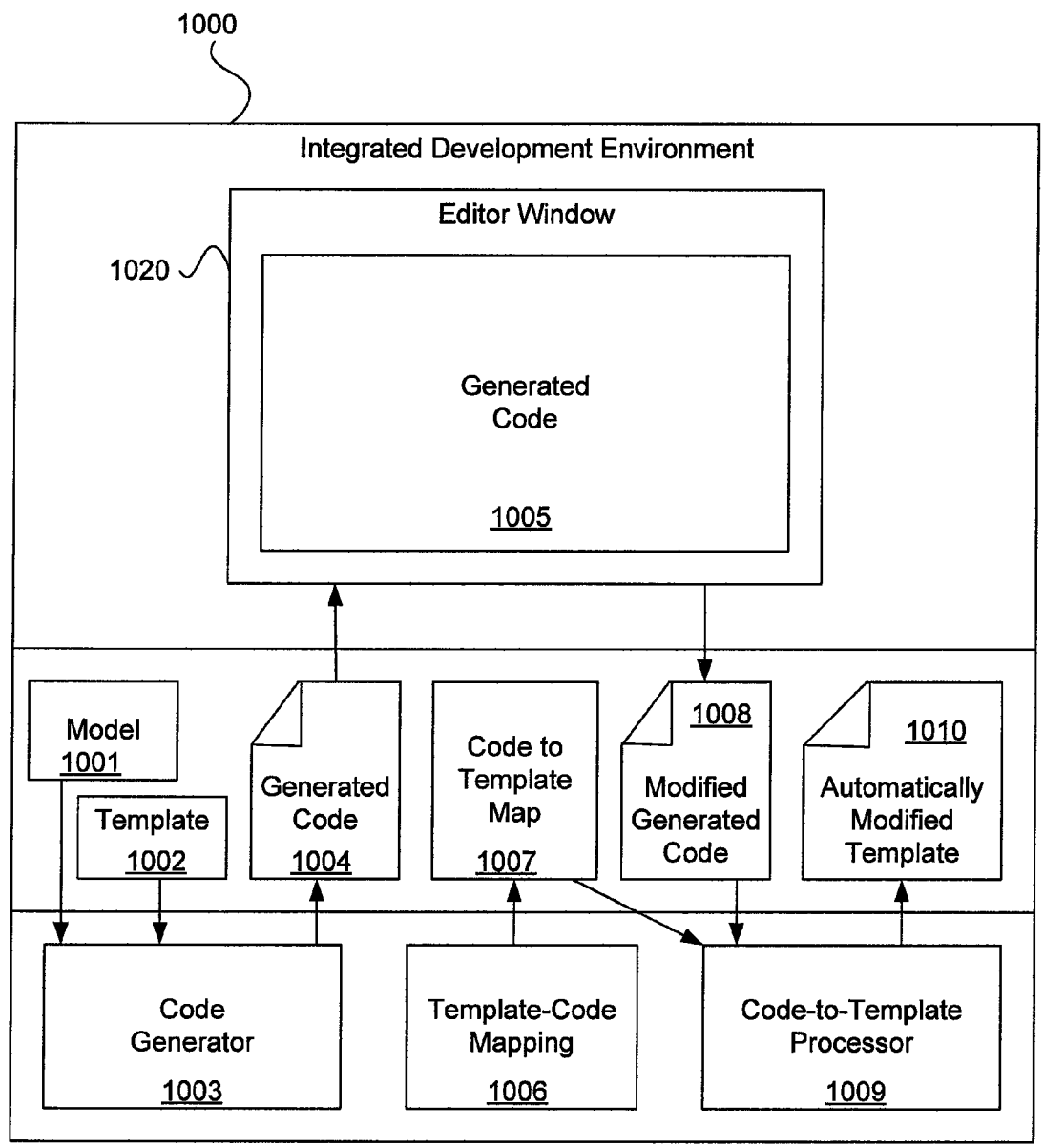
FIG. 10 illustrates an integrated development environment with template reverse engineering according to one embodiment of the present invention.

FIG. 10 illustrates an integrated development environment with template reverse engineering according to one embodiment of the present invention. Integrated development environment ("IDE") 1000 includes an editing window 1020, a code generator 1003, template-code mapping component 1006, and code-to-template processor 1009. A software model 1001 and template 1002 are received by code generator 1003, and generated code 1004 is output by the code generator based on the template and model. The template and model may also be used in this example by template-code mapping component 1006 to generate a code-to-template mapping model 1007. The generated code 1004 may be displayed at 1005 to a user (e.g., a programmer or developer) in editor window 1020. The user may modify the code to produce modified generated code 1008. The modified generated code 1008 and code-to-template mapping model may be used by code-to-template processor 1009 to produce an automatically modified template 1010. Template 1010 may be used to regenerate code with some or all of the modifications from the user automatically.

To realize the above sketched solution for distinguishing between "manual" and "generated" modified code, appropriate editors may be provided that expose which parts in a generated file where generated based on templates and which parts are manually added parts designated as "manual" and forming protected regions. This could be achieved for instance where modified code designated as "generated" is displayed differently than modified code designated as "manual" in a graphical user interface in the IDE. For example, different designations may be assigned different background colors, fonts (e.g., bold, italics, underline), sizes, or text colors or equivalent display distinctions in the editor. The following listing depicts an exemplary code editor for the java class file, which would have been generated from above sketched template.

```
package com.sap.research.salesscenario.quotation;
public class Customer {
    private String name;
```

```
            public String getName( ) {
                System.out.println("manual change!");
                return this.name;
            }
            public void myNewMethod( ) {
                System.out.println("Hello World!");
            }
            public void setName(String name) {
                this.name = name;
            }
        }
```

As illustrated, the parts that belong to the template are not underlined, but could be distinguished in the display by marking the text with an background color (e.g., orange). Code parts that were manually added into the generated class file are underlined, but could be distinguished in the display by marking the text with another background color (e.g., green). Each time the developer changes the template, he/she may decide whether to change the template or to introduce a protected region into the template, preserving the new code from deletion at regeneration (e.g., overwrite protect). This decision could, for example, be made through two different switchable editing modes (e.g., with an appropriate toggle button in the editor's toolbar—not shown).

Change Example

For better illustration, the following listing shows a modified version of the above described code sample on a subsequent run. Such modifications may have been made by the developer, for example. As shown, this time there was a change made to the above shown class definition. A javadoc comment with an author tag was introduced into this code. As illustrated, this change took place within the generated parts of the template and, hence, shall not lead to protected regions in the corresponding template.

```
        package com.sap.research.salesscenario.quotation;
        /**
         * @author Henrik Lochmann
         */
        public class Customer {
            private String name;
            public String getName( ) {
                System.out.println("manual change!");
                return this.name;
            }
            public void myNewMethod( ) {
                System.out.println("Hello World!");
            }
            public void setName(String name) {
                this.name = name;
            }
        }
```

According to the modifications described above, the corresponding generator template would be adjusted to what is listed. As shown below, the javadoc comment was added to the output directive and will now be generated each time the template is triggered.

```
        «DEFINE javaClass(String bundleId) FOR
        businessobjects::BusinessArtefact»
        «FILE getFileForPackage(bundleId, this.name)»
        package «bundleId»;
        /**
         * @author Henrik Lochmann
         */
        public class «this.name»{
            «EXPAND javaProperty FOREACH this.attributes»
            «EXPAND javaProperty FOREACH this.references»
        }
        «ENDFILE»
        «ENDDEFINE»
```

Figure 11:
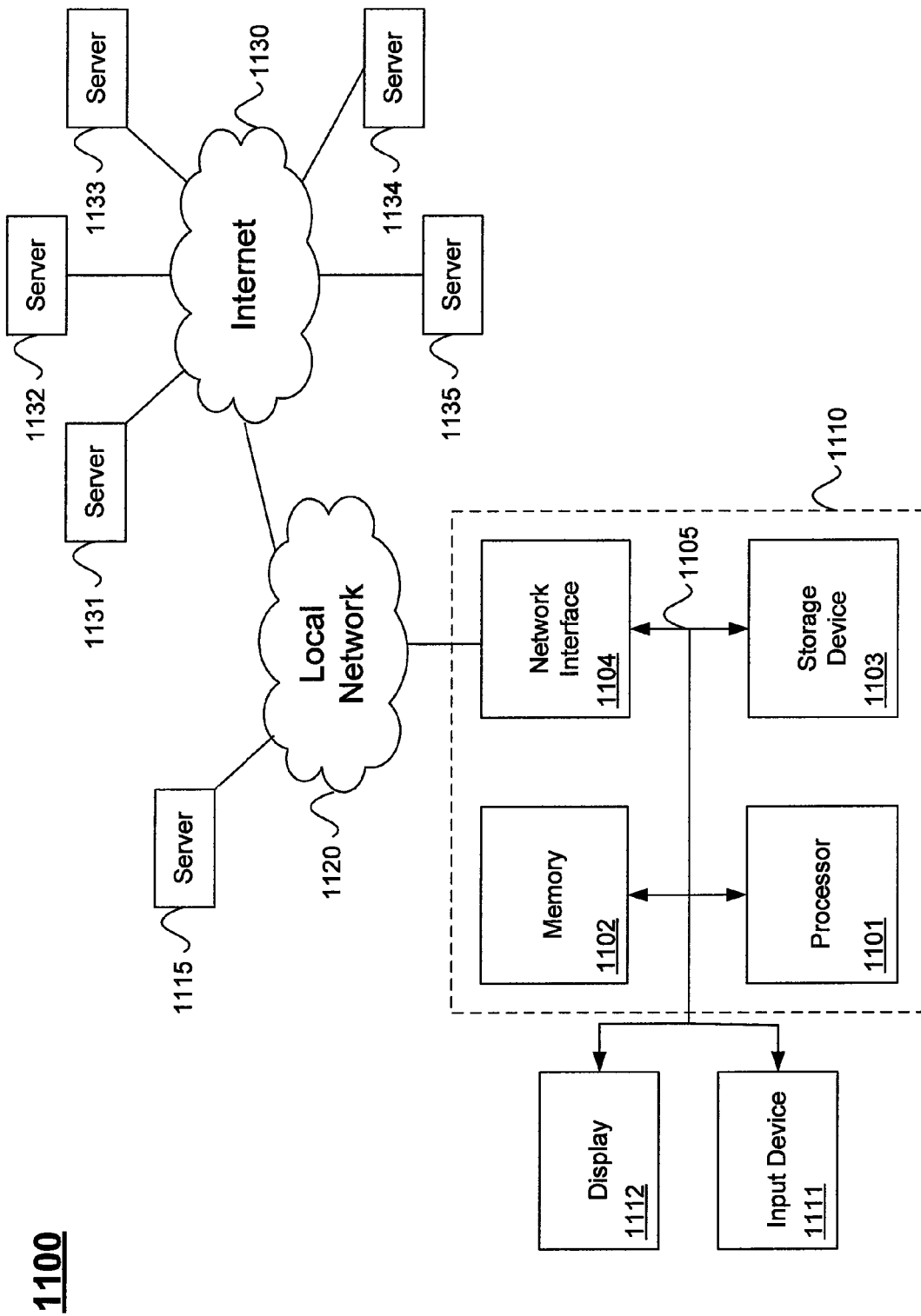
FIG. 11 illustrates system including template reverse engineering according to one embodiment of the present invention.

FIG. 11 illustrates system including template reverse engineering computer system and networks according to one embodiment of the present invention. Computer system 1110 includes a bus 1105 or other communication mechanism for communicating information, and a processor 1101 coupled with bus 1105 for processing information. Computer system 1110 also includes a memory 1102 coupled to bus 1105 for storing information and instructions to be executed by processor 1101, including instructions for performing the techniques described above. This memory may also be used for storing temporary variables or other intermediate information during execution of instructions to be executed by processor 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage devices 1103 and memory 1102 are examples of computer readable mediums for storing software comprising instructions for implementing the techniques described above.

Computer system 1110 may be coupled via bus 1105 to a display 1112, such as a cathode ray tube (CRT) or liquid crystal display (LCD), for displaying information to a computer user. An input device 1111 such as a keyboard and/or mouse is coupled to bus 1105 for communicating information and command selections from the user to processor 1101. The combination of these components allows the user to communicate with the system.

Computer system 1110 also includes a network interface 1104 coupled with bus 1105. Network interface 1104 may provide two-way data communication between computer system 1110 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1104 sends and receives electrical, electromagnetic, or optical signals that carry digital data streams representing various types of information.

Computer system 1110 can send and receive information, including models, templates, and other constructs described above, through the network interface 1104 to an Intranet or the Internet 1130. In the Internet example, electronic materials described above may reside on multiple different computer systems 1110 or servers 1131 across the network. For example, templates or models described above may be created on a local computer system and deployed on one or more servers, for example. A server 1131 may transmit such items through Internet 1130, local network 1120, and network interface 1104 to a component on computer system 1110. Code generators, mapping components, and change processors described above may be implemented on the same system or on different machines than the inputs and outputs they receive and output. The templates, code, or other inputs may then be sent to the processor 1101 via bus 1105 for processing. The received information may then be processed by processor 1101 and/or stored in storage device 1103, or other non-volatile storage for later execution. This process of sending and receiving information may be applied to communication between computer system 1110 and any of the servers 1131 to 1135 in either direction. It may also be applied to communication between any two servers 1131 to 1135.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method modifying templates in a code generation process comprising:
   receiving a template for generating code;
   receiving a model for generating code, wherein the model specifies the operation of the software and comprises a plurality of elements to be translated into code constructs, and wherein the template specifies code constructs to be used for the plurality of elements in the model;
   processing the template and the model in a code generator, and in accordance therewith, generating code based on the model and the template;
   receiving a modification to the generated code, and in accordance therewith, producing modified code;
   automatically changing the template based on the modified code and not on a rewrite of the template by a user to produce a modified template; and
   processing the modified template and the model in the code generator, and in accordance therewith, generating second code based on the model and the modified template, wherein the second code automatically includes the modification;
   mapping one or more elements in said template to corresponding elements in said generated code, wherein the element in said template caused the element in said generated code to be generated, wherein the template comprises a plurality of definitions of source code constructs to be generated based on specified elements of the model, the method further comprising monitoring the processing of the template in said code generator and storing a new mapping element each time a definition is processed, wherein different mapping elements specify a relationship between a definition and a corresponding element in said generated code; and
   wherein the modified code is designated as either manual or generated, wherein modified code designated as generated is used to automatically change the template to automatically produce said modified code, wherein modified code designated as manual is not automatically generated by the template, wherein the modified code is designated manual or generated through a graphical user interface, and wherein modified code designated as generated is displayed differently than modified code designated as manual in said graphical user interface.

2. The computer-implemented method of claim 1 wherein one or more definitions access other templates, and wherein a new mapping element is created each time a new template is accessed.

3. The computer-implemented method of claim 2 wherein the definitions are DEFINE statements and the DEFINE statements include a plurality of EXPAND statements, and wherein a new mapping element is created each time a DEFINE statement is expanded by an EXPAND statement.

4. The computer-implemented method of claim 1 wherein each mapping element specifies the start and end of the code generated by said definition.

5. The computer-implemented method of claim 1 wherein each mapping element stores a start line, end line, start column, and end column of the code generated by said definition.

6. The computer-implemented method of claim 1 wherein each mapping element stores a reference to the definition that caused the generated code to be generated.

7. The computer-implemented method of claim 1 further comprising mapping one or more elements in said model to corresponding elements in said generated code.

8. The computer-implemented method of claim 1 wherein the modified code designated as generated is overwritten during subsequent code generation, and wherein modified code designated as manual is not overwritten during subsequent code generation.

9. The computer-implemented method of claim 1, wherein the modified code is a new code element entered by a user, wherein the new code element is designated as manual, and wherein a protected region is inserted into the template and the modified code.

10. The computer-implemented method of claim 9 wherein the protected region is inserted in the modified template, and wherein the protected region is not overridden when the second code is generated.

11. The computer-implemented method of claim 9 wherein the protected region is inserted in the modified code, and wherein the protected region is not overridden when the second code is generated.

12. The computer-implemented system comprising:
   a code generator that is configured to receive a software model and a template for generating code, wherein the software model specifies the operation of the software and comprises a plurality of elements to be translated into code constructs, and wherein the template specifies code constructs to be used for the plurality of elements in said software model, the code generator being further configured to process the template and the software model, and in accordance therewith, to generate code based on the model and the template;
   a user interface that is configured to display the generated code to a user and receiving a modification to the generated code from the user, and in accordance therewith, to produce modified code;
   a code-to-template change processor that is configured to automatically change the template based on the modified code and not on a rewrite of the template by a user to produce a modified template;
   a mapping component that is configured to map one or more elements in said template to corresponding elements in said generated code, wherein the element in said template caused the element in said generated code to be generated, wherein the template comprises a plurality of definitions of source code constructs to be generated based on specified elements of the model; and
   a template-code mapping component that is configured to monitor the processing of the template in said code generator and to store a new mapping element each time a definition is processed, wherein different mapping elements specify a relationship between a definition and a corresponding element in said generated code, wherein the code generator is further configured to process the modified template and the software model in the code generator, and in accordance therewith, to generate second code based on the model and the modified template, wherein the second code automatically includes the modification, wherein the modified code is designated as either manual or generated, wherein modified code designated as generated is used to automatically change the template to automatically produce said modified code, wherein modified code designated as manual is not automatically generated by the template, wherein the modified code is designated manual or generated through a graphical user interface, and wherein modified code designated as generated is displayed differently than modified code designated as manual in said graphical user interface.

13. The computer-implemented system of claim 12, wherein one or more definitions access other templates, and wherein a new mapping element is created each time a new template is accessed.

14. The computer-implemented system of claim 12, wherein each mapping element specifies the start and end of the code generated by said definition.

15. The computer-implemented system of claim 12, wherein each mapping element stores a reference to the definition that caused the generated code to be generated.

16. The computer-implemented system of claim 12, wherein the template-code mapping component is configured to map one or more elements in said model to corresponding elements in said generated code.

17. The computer-implemented system of claim 12, wherein the modified code designated as generated is overwritten during subsequent code generation, and wherein modified code designated as manual is not overwritten during subsequent code generation.

18. The computer-implemented system of claim 12, wherein the modified code is a new code element entered by a user, wherein the new code element is designated as manual, and wherein a protected region is inserted into the template and the modified code.

19. A non-transitory computer-readable medium containing instructions for controlling a computer system to perform a method modifying templates in a code generation process comprising:

receiving a software model for generating code, wherein the software model specifies the operation of the software and comprises a plurality of elements to be translated into code constructs;

receiving a template for generating code, wherein the template specifies code constructs to be used for the plurality of elements in said software model;

processing the template and the software model in a code generator, and in accordance therewith, generating code based on the software model and the template;

displaying the generated code to a user in an integrated development environment;

receiving a modification to the generated code from the user, and in accordance therewith, producing modified code;

automatically changing the template based on the modified code and not on a rewrite of the template by the user to produce a modified template; and processing the modified template and the software model in the code generator, and in accordance therewith, generating second code based on the model and the modified template, wherein the second code automatically includes the modification, mapping one or more elements in said template to corresponding elements in said generated code, wherein the element in said template caused the element in said generated code to be generated, wherein the template comprises a plurality of definitions of source code constructs to be generated based on specified elements of the model, the method further comprising monitoring the processing of the template in said code generator and storing a new mapping element each time a definition is processed, wherein different mapping elements specify a relationship between a definition and a corresponding element in said generated code; and wherein the modified code is designated as either manual or generated, wherein modified code designated as generated is used to automatically change the template to automatically produce said modified code, wherein modified code designated as manual is not automatically generated by the template, wherein the modified code is designated manual or generated through a graphical user interface, and wherein modified code designated as generated is displayed differently than modified code designated as manual in said graphical user interface.

20. The non-transitory computer-readable medium of claim 19, wherein modified code designated as generated is overwritten during subsequent code generation, and wherein modified code designated as manual is not overwritten during subsequent code generation.

* * * * *